Dec. 25, 1934.  F. ZWIERCAN  1,985,393
HEADLIGHT FOCUSING GAUGE
Filed Nov. 11, 1932  2 Sheets-Sheet 1
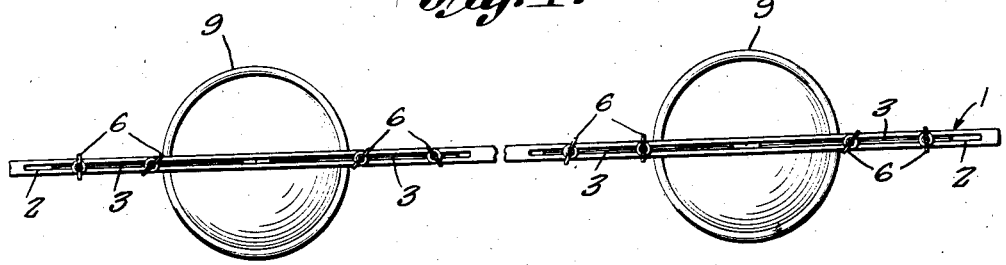
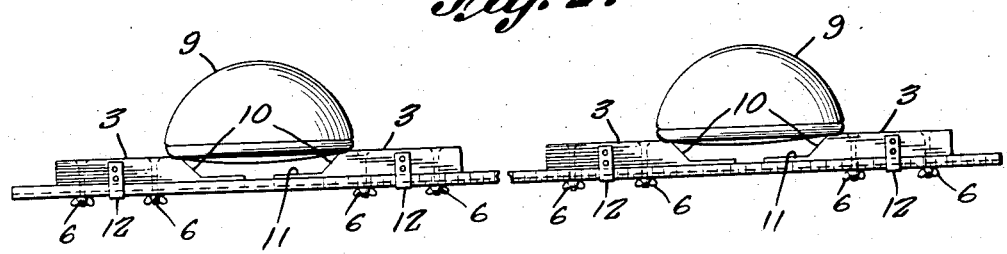
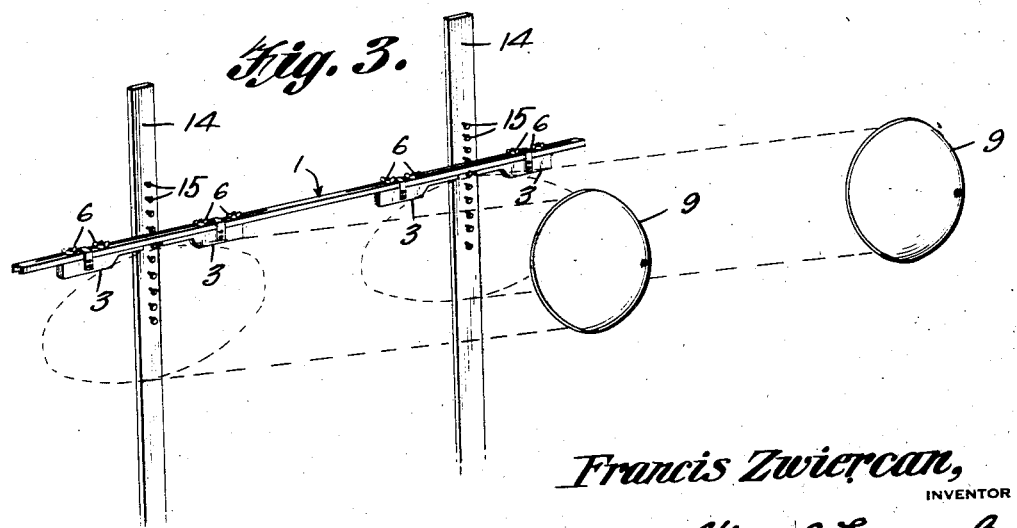
Francis Zwiercan, INVENTOR Dec. 25, 1934.  F. ZWIERCAN  1,985,393
HEADLIGHT FOCUSING GAUGE
Filed Nov. 11, 1932   2 Sheets-Sheet 2
Fig. 4.
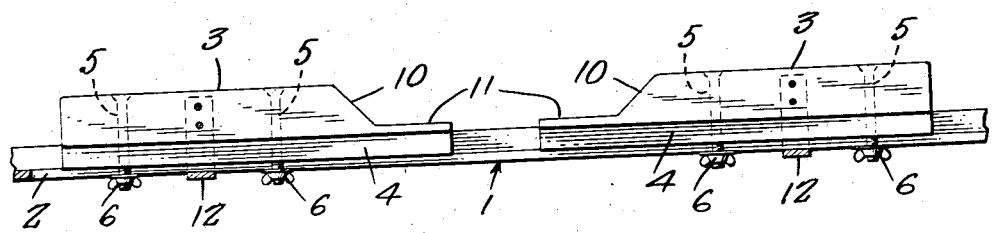
Fig. 5.
Fig. 6.
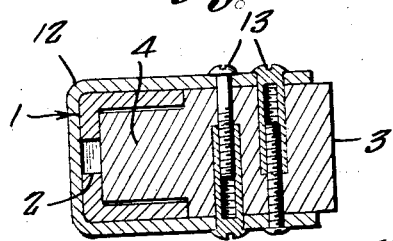
Fig. 7.
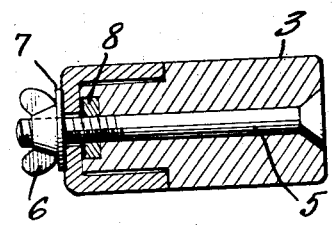
Fig. 8.
Francis Zwiercan,
INVENTOR
BY Victor J. Evans & Co.
ATTORNEY
WITNESS:

Patented Dec. 25, 1934

1,985,393

UNITED STATES PATENT OFFICE 1,985,393

HEADLIGHT FOCUSING GAUGE

Francis Zwiercan, Pittsfield, Mass.

Application November 11, 1932, Serial No. 642,297

1 Claim. (Cl. 33—180)

This invention relates to headlight focusing gauges and has for the primary object, the provision of a device of the above stated character whereby headlights of motor vehicles which differ as to size, design and mounting may be easily, quickly and accurately adjusted to prevent undesirable glare but provide efficient illumination of the roadway, and provide a device which reduces labor and time in making the adjustment of the headlights to a minimum.

With these and other objects in view this invention consists in certain novel features of construction, combination and arrangement of parts to be hereinafter more fully described and claimed.

For a complete understanding of my invention reference is to be had to the following description and accompanying drawings, in which Figure 1 is a front elevation illustrating a gauge applied to headlights and constructed in accordance with my invention.

Figure 2 is a top plan view illustrating the same.

Figure 3 is a perspective view illustrating a gauge operating in conjunction with a target.

Figure 4 is a fragmentary sectional view illustrating a pair of gauge blocks and their connection to the gauge bar.

Figure 5 is a plan view illustrating the same.

Figure 6 is a sectional view taken on the line 6—6 of Figure 5.

Figure 7 is a sectional view taken on the line 7—7 of Figure 5.

Figure 8 is a side elevation illustrating the gauge positioned to measure the distance between the electric lamp of the headlight and the ground as a preliminary to adjustment of the supporting pins of a target accordingly.

Referring in detail to the drawings, the numeral 1 indicates a gauge bar of channel iron construction and having applied to one face thereof a scale divided in inches. The bar is provided with a pair of elongated slots 2, the end walls of which form stops for lamp-engaging blocks 3. The stops are arranged at each end of the bar and adjacent the medial portion of the bar 1. The blocks 3 have reduced portions 4 slidably received in the channel of the gauge bar 1 and are adjustably connected to said bar by bolts 5 carried by the blocks and extending through the slots and receiving thereon wing nuts 6. The bolts 5 are provided with washers 7 between the nuts and the gauge bar. The reduced portions 4 of the blocks have embedded therein nuts 8 which are threaded onto the bolts 5 for tightly securing said bolts to the blocks and against turning movement relative thereto during the tightening or loosening of the wing nuts. The blocks 3 are arranged in pairs, as shown in Figure 2, one pair for each headlight 9 and have their opposing ends cut away to form angularly related faces 10 and 11. U-clamps 12 fit about the gauge bar 1 and are secured to the blocks by fasteners 13 whereby the blocks remain slidably secured to the gauge bar when the wing nuts are turned to free the blocks for sliding movement relative to the bar. The fasteners 13 are of the male and female type having threaded connection and are reversely arranged, as shown in Figure 6, for balancing the bar. By having the pairs of blocks adjustably mounted on the gauge bar and relative to each other provides means whereby the device may be employed on various types, designs and sizes of headlights. The surfaces 10 and 11 permit the blocks to set against opposite sides of headlights of different diameters to a limited extent without requiring adjustment of all the blocks along the gauge bar and also provide clearance for projecting convex lenses.

In use, the pairs of blocks are first adjusted apart so as to operate in conjunction with the headlight of a certain size. The gauge bar is then placed horizontally in front of the headlights, as shown in Figure 1, bringing the pairs of blocks into engagement with opposite sides of the rims of the headlights and if the headlights are properly adjusted the four blocks rest evenly against the rims of both headlights. However, should one of the headlights be out of adjustment or turned slightly relative to the other headlight, the gauge will not then engage the headlights at four points, consequently indicating the amount the headlight must be turned in order to bring both headlights into proper adjustment relative to each other.

Used in connection with the gauge bar 1 is a target as shown in Figure 3, consisting of a pair of vertically arranged supports 14 having a series of openings to removably receive pegs 15 on which the gauge bar is to be positioned for the purpose of determining the proper tilt of the headlights. When focusing the headlights, the motor vehicle is positioned approximately 25 ft. from the target and, as shown in Figure 8, the distance between the electric lamp of the headlight and the ground is measured by the scale on the gauge bar. Noting the exact measurement, the gauge bar is then positioned on the target a corresponding distance from the ground. The electric lamps are then adjusted within the headlights until the light beams come within the spaces formed between the pairs of blocks and strike the target below the gauge bar, as shown in Figure 3, the angular surfaces 10 and 11 indicating approximately the area or space within which the upper edge of the beam should pass. The headlights thus adjusted will be free of undesirable glare and will efficiently illuminate the roadway at a proper distance in advance of the motor vehicle.

While I have shown and described the preferred embodiment of my invention, it will be understood that minor changes in construction, combination and arrangement of parts may be made without departing from the spirit and scope of my invention, as claimed.

Having described the invention, I claim:

A headlight focusing gauge comprising a rigid integral channeled bar provided with longitudinal slots in the base of its channel, pairs of headlight engaging blocks having portions slidably seating in the channel of the bar, bolts carried by the blocks and passing therethrough, the threaded ends of the bolts projecting through the slots in the bar, clamping nuts mounted on the ends of the bolts and bearing against the bar, and lock nuts mounted on the bolts and embedded in the blocks.

FRANCIS ZWIERCAN.